(12) United States Patent
Armstrong

(10) Patent No.: US 10,194,637 B2
(45) Date of Patent: Feb. 5, 2019

(54) DRINKING APPARATUS FOR PETS

(71) Applicant: Doskocil Manufacturing Company, Inc., Arlington, TX (US)

(72) Inventor: Gavin Armstrong, Londonderry (GB)

(73) Assignee: DOSKOCIL MANUFACTURING COMPANY, INC., Arlington, TX (US)

(*) Notice: Subject to any disclaimer, the term of this patent is extended or adjusted under 35 U.S.C. 154(b) by 462 days.

(21) Appl. No.: 15/083,604

(22) Filed: Mar. 29, 2016

(65) Prior Publication Data

US 2016/0286757 A1 Oct. 6, 2016

(30) Foreign Application Priority Data

Apr. 3, 2015 (GB) .................................. 1505822.5

(51) Int. Cl.
*A01K 7/02* (2006.01)
*A01K 7/04* (2006.01)
*A01K 7/00* (2006.01)

(52) U.S. Cl.
CPC ............... *A01K 7/04* (2013.01); *A01K 7/02* (2013.01); *A01K 7/00* (2013.01)

(58) Field of Classification Search
CPC . A01K 7/04; A01K 7/00; A01K 7/005; A01K 7/02; A01K 7/022; A01K 7/025; A01K 7/06

(Continued)

(56) References Cited

U.S. PATENT DOCUMENTS 1,801,932 A 7/1927 Miller
4,274,365 A * 6/1981 Peters .................... A01K 7/04
119/78

(Continued)

FOREIGN PATENT DOCUMENTS

DE 102009018324 A1 11/2010
WO 9509981 A1 4/1995

(Continued)

OTHER PUBLICATIONS

International Preliminary Report on Patentability and Written Opinion dated Oct. 3, 2017 in corresponding International Application No. PCT/US2016/024660, filed Mar. 29, 2016.

(Continued)

*Primary Examiner* — Marc Burgess
(74) *Attorney, Agent, or Firm* — Global IP Counselors, LLP

(57) ABSTRACT

A drinking apparatus includes a drinking receptacle, a liquid reservoir, a pump, a controller, and a liquid detector. The liquid reservoir has a liquid outlet for dispensing liquid into the drinking receptacle. The pump has an inlet in liquid communication with the drinking receptacle, and an outlet in liquid communication with the reservoir. The controller is configured to control the operation of the pump. The liquid level detector is configured to detect when the level of liquid in the reservoir is below a first threshold level. The controller is responsive to the liquid level detector to operate the pump to pump liquid from the drinking receptacle into the reservoir when the liquid level detector indicates that the level of liquid in the reservoir is below the threshold level, and the controller is configured to deactivate the pump at the end of a pumping period.

20 Claims, 3 Drawing Sheets

(58) Field of Classification Search
USPC .......... 137/392, 396, 565.16; 141/83, 94, 95
See application file for complete search history.

(56) References Cited

U.S. PATENT DOCUMENTS

| | | | | |
|---|---|---|---|---|
| 5,845,600 | A | * | 12/1998 | Mendes ................... A01K 7/02 119/51.5 |
| 6,055,934 | A | | 5/2000 | Burns et al. |
| 6,062,166 | A | * | 5/2000 | Macrina ............... A01K 5/0291 119/51.11 |
| 6,460,483 | B1 | | 10/2002 | Northrop et al. |
| 7,281,494 | B1 | | 10/2007 | Connerley |
| D637,770 | S | | 5/2011 | Lipscomb et al. |
| 7,972,117 | B1 | | 7/2011 | Macdonald |
| D659,914 | S | | 5/2012 | Lipscomb |
| 8,381,685 | B2 | * | 2/2013 | Lipscomb ............ A01K 45/002 119/74 |
| 8,464,661 | B1 | | 6/2013 | Dunn et al. |
| D692,623 | S | | 10/2013 | Lipscomb |
| D694,477 | S | | 11/2013 | Rowe et al. |
| 9,066,496 | B2 | * | 6/2015 | Hymes ................... A01K 7/02 |
| 9,402,375 | B2 | * | 8/2016 | Lipscomb ................ A01K 7/00 |
| 9,572,323 | B2 | * | 2/2017 | Lipscomb ................ A01K 7/02 |
| 2008/0190374 | A1 | * | 8/2008 | Farris ....................... A01K 7/00 119/74 |
| 2008/0257272 | A1 | * | 10/2008 | Bolda ....................... A01K 7/02 119/72 |
| 2011/0259273 | A1 | * | 10/2011 | Lipscomb ................ A01K 7/02 119/74 |
| 2014/0069340 | A1 | * | 3/2014 | Lipscomb ................ A01K 7/00 119/74 |
| 2014/0251223 | A1 | | 9/2014 | Rowe et al. |
| 2015/0189856 | A1 | * | 7/2015 | Alexander ............... A01K 7/02 119/74 |
| 2015/0208609 | A1 | * | 7/2015 | Tillet ....................... A01K 7/02 119/74 |

FOREIGN PATENT DOCUMENTS

| | | |
|---|---|---|
| WO | 2011135043 A1 | 11/2011 |
| WO | 2014154777 A1 | 10/2014 |

OTHER PUBLICATIONS

Extended European Search Report dated Sep. 18, 2018 in corresponding European Patent Application No. 16773975.4, filed Sep. 21, 2017.

* cited by examiner

DRINKING APPARATUS FOR PETS

CROSS-REFERENCE TO RELATED APPLICATIONS

This application claims priority to Great Britain Application No. 1505822.5, filed Apr. 3, 2015, the contents of which is hereby incorporated herein by reference.

BACKGROUND

Field of Invention

The present invention relates to drinking apparatus. The invention relates particularly to a drinking apparatus for pets, especially of a type known as a drinking fountain.

Background to the Invention

Pet water fountains which dispense water to pets are in common usage. Known pet fountains include electronically driven pumps that move water froma reservoir, through a filter and into a bowl as a stream overflowing from the upper end of a drinking spout. This is considered to be advantageous in terms of keeping the water fresh and clean for the pet. Such fountains suffer from the following disadvantages: (1) required continuous operation of the pump to ensure that flowing water is available at all times for the pet; (2) dry running of the pump when water levels are low, which can damage the pump and cause noise that can deter pets from using the fountain. Water level indicators positioned in the reservoir have been employed to stop the pump when the water level is too low for the pump to function. However, this can lead to confusion of the pet when it seeks a drink from the fountain and can cause the pet to seek another, possibly undesirable source of water.

It would be desirable to mitigate at least some of the problems associated with convention pet fountains.

SUMMARY

The present invention provides a drinking apparatus comprising a drinking receptacle, a liquid reservoir, a pump, a controller, and a liquid detector. The liquid reservoir has a liquid outlet for dispensing liquid into the drinking receptacle. The pump has an inlet in liquid communication with the drinking receptacle, and an outlet in liquid communication with the reservoir, the pump being operable to pump liquid from the drinking receptacle into the reservoir. The controller is configured to control the operation of the pump. The liquid level detector is configured to detect when the level of liquid in the reservoir is below a first threshold level. At least part of the reservoir is located, in use, above the drinking receptacle, the liquid outlet being located such that, in use, liquid is dispensed from the reservoir through the liquid outlet under action of gravity, and the controller is responsive to the liquid level detector to operate the pump to pump liquid from the drinking receptacle into the reservoir when the liquid level detector indicates that the level of liquid in the reservoir is below the threshold level, and the controller is configured to deactivate the pump at the end of a pumping period.

Preferred features of the invention are disclosed herein.

Preferably the invention is embodied as a battery-operated pet water fountain. The preferred apparatus is battery powered and keeps the pet drinking water continuously aerated for an extended period of time, which can presently only be obtained by means of mains electricity. The preferred apparatus also has the ability to monitor the quality of the water that is being presented to the pet.

Advantageously, preferred embodiments of the invention require relatively little maintenance and are not required to be connected to an electrical mains supply.

Further advantageous features of the invention will be apparent to those ordinarily skilled in the art upon review of the following description of a specific embodiment and with reference to the accompanying drawings.

BRIEF DESCRIPTION OF THE DRAWINGS

The invention will be explained in more detail hereinafter with reference to the drawings.

DETAILED DESCRIPTION OF THE EMBODIMENTS

Figure 1:
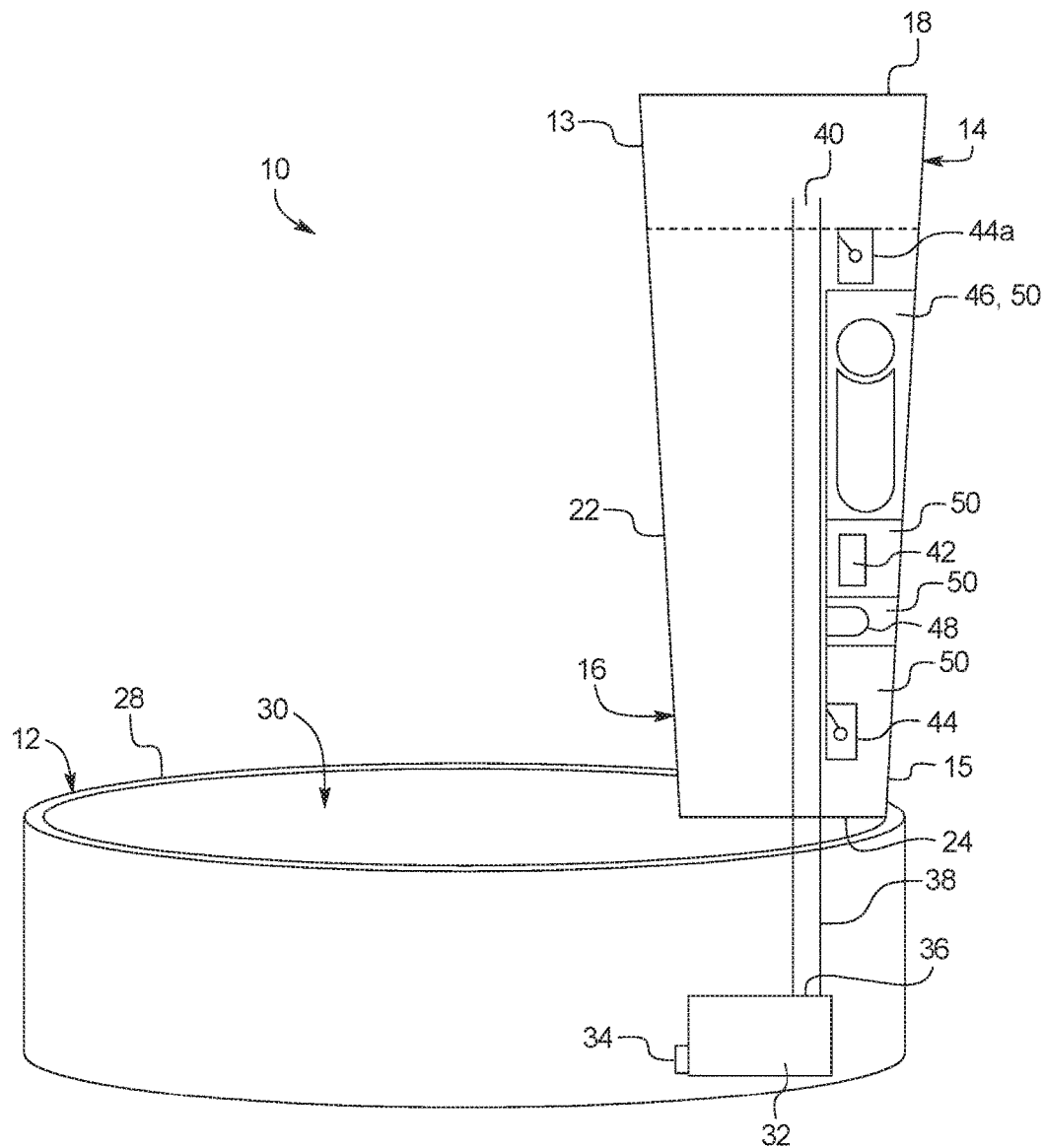
FIG. 1 is a schematic view of a drinking apparatus embodying title invention.

Referring now to FIG. 1 of the drawings, there is shown, generally indicated as 10, a drinking apparatus embodying the invention. The apparatus comprises an open drinking receptacle 12. In preferred embodiments, the receptacle is a bowl, although any other receptacle from which an animal, especially a pet such as a dog or cat, can drink could alternatively be used. The receptacle 12 may be formed form plastics or any other convenient material.

The apparatus 10 includes a liquid reservoir 14 having a liquid outlet 16 for dispensing liquid, usually water (not shown), into the bowl 12. The reservoir 14 may take any convenient form but preferably comprises a rigid or semi-rigid self-supporting structure for containing liquid, and may for example be formed from plastics. The reservoir 14 may have an open mouth 18, typically at its in-use upper end, to allow the reservoir to be filled, cleaned and/or maintained. Preferably a lid (not shown in FIG. 1 but shown as 120 in FIGS. 2 and 3) is provided for closing the mouth 18.

The liquid outlet 16 conveniently comprises an aperture formed in the reservoir 14, e.g. in a side 22 or base 24 of the reservoir, and may optionally comprise a spout (not shown). In alternative embodiments (not illustrated), the liquid outlet may be closable, e. g. by a valve or other closing device, which is preferably electrically operable.

The liquid outlet 16 is preferably located at or substantially at the bottom 15 of the reservoir 14, e.g. in the base 24 or in the side 22 adjacent the base 24. This allows substantially all of the liquid to drain from the reservoir 14 as is described in more detail hereinafter. The outlet 16 may alternatively be located elsewhere between the bottom 15 and top 13 of the reservoir 14, preferably closer to the bottom 15 than the top 13.

At least part of the reservoir 14 is located, in use, above the bowl 12, the outlet being located such that, in use, liquid is dispensed from the reservoir 14 through the outlet 16 under the action of gravity. In preferred embodiments, substantially the entire reservoir 14 is located above the bowl 12, for example such that the bottom 15 of the reservoir 14 is substantially level or above the top of the bowl 12. The top of the bowl may be defined by the rim 28 of its open mouth 30. Hence the outlet 16 is preferably located substantially at or above the level of the mouth 30.

Figure 2:
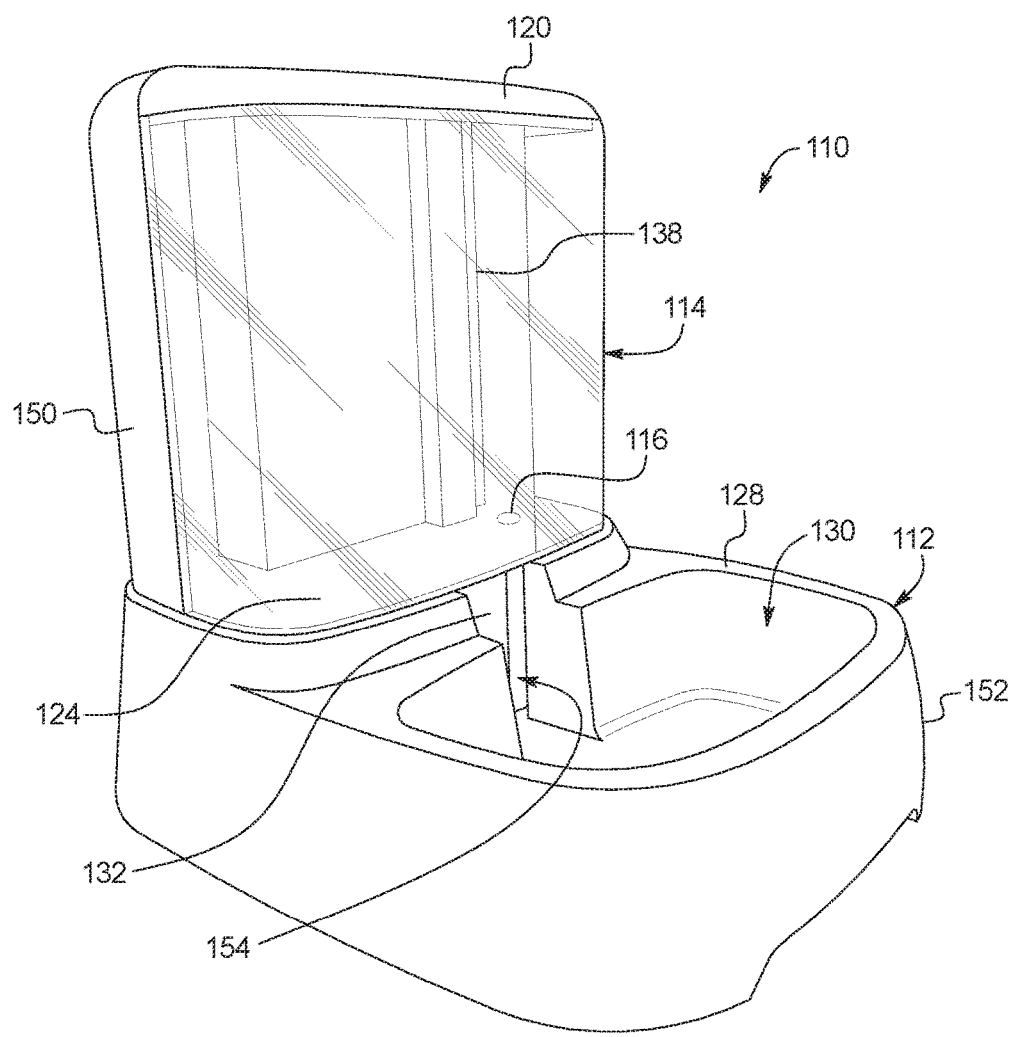
FIG. 2 is a perspective view of a specific embodiment ofttle drinking apparatus of the invention.
Figure 3:
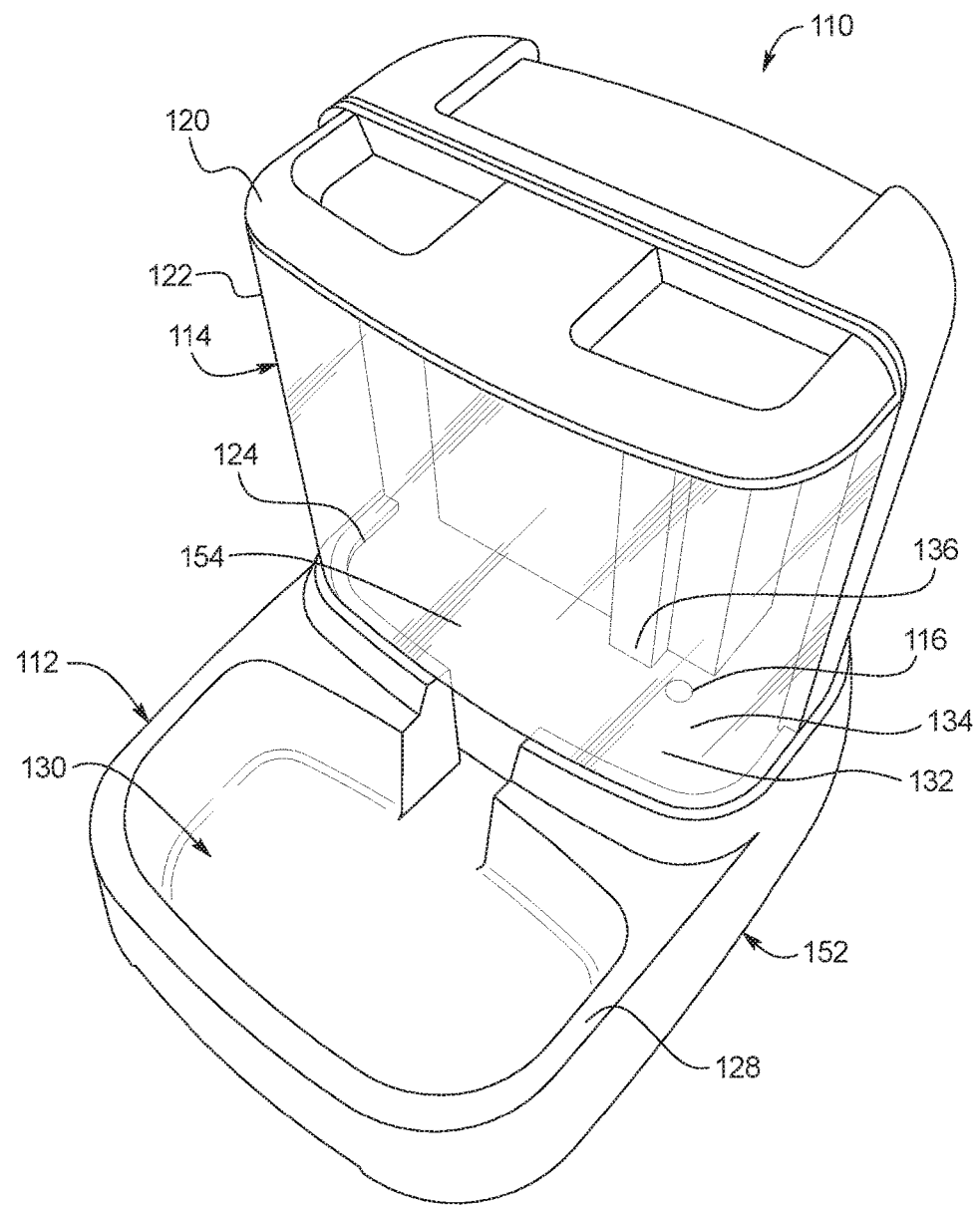
FIG. 3 is an alternative perspective view of the drinking apparatus of FIG. 2.

In preferred embodiments, the outlet 16 is located over the mouth 30 to allow liquid to flow, in use, from the outlet 16 into the mouth 30 under the action of gravity. The arrangement may be such that the liquid flows directly into the open mouth 30 from the outlet 16 (for example as illustrated in FIG. 1) or indirectly via an intermediate structure (not shown), such as a chute, hose, pipe, surface, or conjoined liquid compartment 154 as illustrated in FIGS. 2 and 3.

In alternative embodiments, the arrangement may be such that the outlet 16 is below the level of the mouth 30. For example the bottom of the reservoir 14 may be below the level of the mouth 30, and may for example be level with the bottom of the bowl 12.

In preferred embodiments, the reservoir 14 is mounted on the bowl 12, at least during use, i.e. it may be removably mountable on the bowl 12. Typically the bowl 12 serves as the base of the apparatus 10.

The apparatus 10 includes a pump 32, in particular an electrically operated pump. The pump 32 has an inlet 34 by which liquid is drawn into the pump, and an outlet 36 by which the liquid is pumped out of the pump. In use, the inlet 34 draws liquid from the bowl 12 and the outlet 36 feeds the pumped liquid into the reservoir 14. The inlet 34 is therefore in liquid communication with the inside of bowl (e.g. by locating the inlet 34 itself in the bowl or by means of a pipe, hose or other conduit), while the outlet 36 is in fluid communication with the inside of the reservoir 14 (e.g. by locating the outlet 36 itself in the bowl or by means of a pipe, hose or other conduit). In preferred embodiments, a self-supporting pipe 38 is connected to the outlet 36 to feed liquid into the reservoir 14. The pipe 38 has preferably has an outlet 40 positioned above the bottom 15 of the reservoir 14, and preferably located at or adjacent the top 13 of the reservoir 14.

The pump 32 may be located in any convenient location on or in the apparatus 10, include the bowl 12, the reservoir 14 or in another compartment/chamber, e.g. adjacent the bowl 12. Typically the pump is a submersible pump.

The apparatus 10 further includes a controller 42 for controlling the operation of the pump 32 and any other electrically operable components of the apparatus, e.g. liquid level detectors, valves, purity sensors, displays or visual or audible alarms. The controller 42 may take any conventional form, e.g. a suitably programmed microprocessor, microcontroller, macrocontroller, PLC or other electronic or computing device.

A liquid level detector 44 is provided for detecting when the level of liquid in said reservoir is below a first threshold level. The liquid level detector 44 may be configured to generate one or more output signals indicating if the liquid level in the reservoir 14 is below the threshold level and/or when the liquid level drops below the threshold level. The liquid level detector 44 may be of any conventional type, for example it may comprise a float switch, a radio frequency (RF) sensor, an optical sensor or an electric field sensor. In use the controller 42 receives the output signal(s) from the level detector 44 by any convenient wired and/or wireless connection and is responsive to them to operate the pump 32. In particular, the controller 42 is responsive to the output of the liquid level detector 44 to cause the pump 32 to pump liquid from the bowl 12 into the reservoir 14 when the liquid level detector 44 indicates that the level of liquid in said reservoir is below the threshold level, preferably when the liquid level detector 44 indicates when the level of liquid in said reservoir drops below the threshold level.

In preferred embodiments, the liquid level detector 44 is arranged (e.g. located and/or positioned and/or directed) such that the threshold level is at or above the outlet 16, preferably substantially at the outlet 16. Hence, the pump 32 will operate to replenish the reservoir 14 from the bowl 12 each time the liquid drains from it through the outlet 16. The detector 44 may be located in the reservoir, or in a compartment adjacent the reservoir, as is convenient.

The controller 42 is configured to deactivate the pump 32 at the end of a pumping period. In preferred embodiments, the pumping period is defined as a predetermined length of time after pumping has begun. To this end the controller 42 may include a timer and be programmed to stop pumping after the predetermined period of time has elapsed. The length of the pumping period can be calculated depending on the respective liquid capacities of the bowl 12 and reservoir 14, e.g. to avoid the reservoir is not overfilled and/or reduce the risk that the pump runs dry. Preferably, the capacity of the reservoir is at least as much as the capacity of the bowl.

Alternatively, or in addition, the controller 42 is configured to end the pumping period in response to receiving one or more signals from one or more other devices, for example from the liquid level detector 44 (which may be capable of detecting liquid levels at other threshold levels than the one described above) and/or one or more other liquid level detectors (not shown). For example, a liquid level detector may be provided for detecting when the level of liquid in the reservoir 14 is above a second threshold level, the second threshold level being higher, in use, than the first threshold level described above. The second threshold level may represent an upper fill level for the reservoir, the controller 42 stopping the pump 32 when the liquid in the reservoir reaches the upper fill level. A liquid level detector may be provided for detecting when the level of liquid in the bowl 12 is below a minimum threshold level. The minimum threshold level may represent a minimum level beyond which the pump will run dry, the controller 42 stopping the pump 32 when the liquid in the reservoir reaches the minimum level.

Advantageously, the apparatus 10 is battery-operated and includes a battery chamber 46 for receiving one or more batteries. Preferably, all of the electrically operable components of the apparatus are battery-powered, including the controller 42, pump 32 and if applicable, liquid level detector(s) and any valves, purity sensors, displays or visual or audible alarms that may be present.

In preferred embodiments, the apparatus 10 is portable, and since it does not need to be connected to an electrical mains supply, it can readily be moved to any location that suits a pet.

Optionally, at least one filter (for example any conventional water filter) is provided in said reservoir, positioned between the inlet to the reservoir (which in the illustrated embodiment is provided by the outlet 40 of pipe 38) and the outlet 16.

Optionally, a water purity sensor 48 is provided for monitoring the purity of the liquid (assumed to be water in this example) in the reservoir 14. The sensor 48 may be connected to the controller 42 (e.g. by wired or wireless link) and provide an output signal to the controller indicative of water quality, or may be a stand-alone component that includes a visual and/or audible output device for indicating the detected water quality.

More generally, one or more visual and/or audible output devices, e.g. a visual display, light (e.g. LED) or buzzer, may be included in the apparatus 10 for providing information to the user in relation to the state of the apparatus 10. Such devices may be connected to and/or controlled by the controller 42 as is convenient.

The apparatus 10 may include one or more liquid-tight compartments 50 for containing any non-submersible or non-water resistant components of the apparatus 10, e.g. the batteries, the controller, the purity sensor, the level detector, as applicable.

Typically, manually operable controls are provided to allow the user to activate or deactivate the pump manually if required.

In use, the bowl 12 is filled with water (either directly or by filling the reservoir 14 whereupon the water will be dispensed into the bowl via the outlet 16). When the level detector 44 indicates that the water level in the reservoir 14 is below the threshold level, and in particular when it drops below the threshold level, the controller 42 activates the pump 32 to replenish the reservoir 14 from the bowl 12. After the pumping period is over, the pump 32 is deactivated by the controller 42. The water in the reservoir 14 is dispensed from the reservoir 14 into the bowl 12 via the outlet 16 under the action of gravity. When the level detector 44 indicates that the water level in the reservoir 14 drops below the threshold level, the controller 42 again activates the pump 32 to replenish the reservoir 14 from the bowl 12. Hence the controller implements pumping cycles between which the pump is turned off.

In preferred embodiments, the flow capacity provided by the outlet 16 is relatively restricted (e.g. between approximately 2 mm and 10 mm in width) such that the time taken for the water to drain from the reservoir 14 is relatively long in comparison with the time taken by the pump 32 to replenish the reservoir 14, i.e. the time between successive pumping periods is longer than the length of the pumping period, preferably by at least an order of magnitude. For example the pump may have the capacity to fill the reservoir 14 with water in a few seconds (e.g. 5 to 30 seconds), while the water may take several minutes (e.g. 5 to 60 minutes, preferably 20 to 25 minutes) to drain from the reservoir. As a result, the battery operated pump 32 remains in an off state for the majority of the time.

Hence, the pump 32 need only operate for a relatively short period of time to provide a continuous flow of aerated water to the pet. The apparatus 10 therefore may have the ability to provide continuously flowing water for a number of months or years using currently available consumer batteries and without the need of mains powered electricity. Further, the limitation of the operating time of the pump expands the life span of the pump, reduces the rate of build-up in filters, reducing the time between cleanings of the apparatus, in addition to reduced energy consumption in comparison to known pet fountains.

Referring now to FIGS. 2 and 3, a specific embodiment of the apparatus is shown, generally indicated as 110. The apparatus 110 is similar to the apparatus 10 and the same description applies unless otherwise indicated or apparent. Like numerals are used in FIGS. 2 and 3 to denote like parts with the apparatus 10 of FIG. 1.

As can be seen from FIGS. 2 and 3, the apparatus 110 includes a bowl 112, reservoir 114, liquid outlet 116, lid 120, pump 132, pipe 138 and compartment 150.

The bowl 112 is part of a base structure 152 that includes another liquid compartment 154 (which may be considered to be part of the liquid receptacle 112) adjacent and in liquid communication with the pet-accessible bowl 112, in which the pump 132 is located. The compartment 154 has an open mouth the rim of which serves as a mounting structure for the reservoir 114 such that the reservoir 114, when fitted, is located over the compartment 154. The outlet 116 is in the base 124 of the reservoir 114 and is positioned to dispense water from the reservoir 114 into the compartment 154 and therefore into the bowl 112.

The invention is not limited to the embodiment(s) described herein but can be amended or modified without departing from the scope of the present invention.

What is claimed is:

1. A drinking apparatus comprising:
    a drinking receptacle;
    a liquid reservoir having a liquid outlet configured to dispense liquid into the drinking receptacle;
    a pump having an inlet in liquid communication with the drinking receptacle, and an outlet in liquid communication with the reservoir, the pump being configured to pump liquid from the drinking receptacle into the reservoir;
    a controller programmed to control the operation of the pump; and
    a liquid level detector configured to detect when the level of liquid in the reservoir is below a first threshold level,
    at least part of the reservoir being located, in use, above the drinking receptacle, the liquid outlet being located such that, in use, liquid is dispensed from the reservoir through the liquid outlet by gravity,
    the controller being responsive to the liquid level detector to operate the pump to pump liquid from the drinking receptacle into the reservoir when the liquid level detector indicates that the level of liquid in the reservoir is below the first threshold level,
    and the controller being configured to deactivate the pump at the end of a pumping period.

2. The apparatus of claim 1, wherein the controller is configured to end the pumping period a predetermined length of time after pumping is begun.

3. The apparatus of claim 1, wherein the controller is configured to end the pumping period in response to at least one signal from a second liquid level detector.

4. The apparatus of claim 3, wherein the liquid level detector is a first the liquid level detector, and the second liquid level detector is configured to detect when the level of liquid in the reservoir is above a second threshold level, the second threshold level being higher, in use, than the first threshold level.

5. The apparatus of claim 3, wherein the liquid level detector is a first the liquid level detector, and the second liquid level detector is configured to detect when the level of liquid in the receptacle is below a threshold level.

6. The apparatus of claim 1, wherein the liquid level detector comprises at least one of a float switch, a radio frequency sensor, an optical sensor, and an electric field sensor.

7. The apparatus of claim 1, wherein the liquid reservoir is disposed above the drinking receptacle and the liquid outlet is disposed at or substantially at a bottom of the reservoir.

8. The apparatus of claim 1, wherein the liquid reservoir is mounted on the receptacle.

9. The apparatus of claim 1, wherein the receptacle has an open mouth, the liquid outlet being disposed substantially at or above a level of the open mouth.

10. The apparatus of claim 1, wherein the receptacle has an open mouth, the liquid outlet being disposed over the open mouth to allow liquid to flow, in use, from the outlet into the open mouth by gravity.

11. The apparatus of claim 1, wherein the pump is disposed in one of the receptacle and a chamber adjacent the receptacle.

12. The apparatus of claim 1, further comprising a battery chamber configured to receive at least one battery, the controller, the pump and, the liquid level detector being powered by the at least one battery.

13. The apparatus of claim 1, wherein the apparatus is portable.

14. The apparatus of claim 1, further comprising at least one water filter disposed in the reservoir, and positioned between a liquid inlet to the reservoir and the liquid outlet.

15. The apparatus of claim 1, further comprising a water purity sensor configured to monitor the purity of the liquid in the reservoir.

16. The apparatus of claim 1, wherein the controller is responsive to the liquid level detector to operate the pump to pump liquid from the drinking receptacle into the reservoir when the liquid level detector indicates that the level of liquid in the reservoir is below the first threshold level.

17. The apparatus of claim 1, wherein the liquid level detector is arranged such that the first threshold level is at or above the liquid outlet.

18. The apparatus of claim 1, further comprising a second liquid level detector.

19. The apparatus of claim 1, wherein the liquid reservoir is removably mounted on the receptacle.

20. The apparatus of claim 1, wherein the liquid level detector is arranged such that the first threshold level is substantially at the liquid outlet.

* * * * *